United States Patent
Blouin et al.

(10) Patent No.: US 7,359,824 B2
(45) Date of Patent: Apr. 15, 2008

(54) SYSTEMS AND METHODS FOR A DISTRIBUTED EXECUTION ENVIRONMENT WITH PER-COMMAND ENVIRONMENT MANAGEMENT

(75) Inventors: Eric Erhard Blouin, Ardmore, PA (US); Barry Alan Kritt, Raleigh, NC (US); Douglas Alan Law, Chapel Hill, NC (US); Kuldip Nanda, Apex, NC (US); Paul Allen Roberts, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/170,353

(22) Filed: Jun. 29, 2005

(65) Prior Publication Data

US 2007/0005283 A1    Jan. 4, 2007

(51) Int. Cl.
*G01M 19/00* (2006.01)
(52) U.S. Cl. .................................... 702/122
(58) Field of Classification Search ............... 702/122
See application file for complete search history.

(56) References Cited

U.S. PATENT DOCUMENTS

| 5,136,705 | A | * | 8/1992 | Stubbs et al. ............. 714/27 |
| 6,266,407 | B1 | | 7/2001 | Kneipp et al. |
| 2001/0052030 | A1 | | 12/2001 | Shiraishi |
| 2003/0234737 | A1 | | 12/2003 | Nelson et al. |
| 2004/0103138 | A1 | | 5/2004 | Lamport et al. |
| 2004/0153637 | A1 | * | 8/2004 | Harper et al. ............. 713/1 |
| 2005/0060706 | A1 | * | 3/2005 | Doyon et al. ............ 718/100 |

* cited by examiner

*Primary Examiner*—John E. Barlow, Jr.
*Assistant Examiner*—Lisa C. Sievers
(74) *Attorney, Agent, or Firm*—Joscelyn G. Cockburn; Schubert Osterrieder & Nickelson PLLC

(57) ABSTRACT

Systems, methods and media for providing a distributed execution environment with per-command environment management are disclosed. In one embodiment, a plurality of digital systems are connected to a serving device. The serving device comprises a sequencer to originate environment attributes and commands to be executed within the environment. Each digital system under test and serving device comprises a listener with a queue to receive environment attributes and commands. A listener on a digital system under test or serving device implements the environment attributes and executes the received commands within the specified environment.

6 Claims, 3 Drawing Sheets

SYSTEMS AND METHODS FOR A DISTRIBUTED EXECUTION ENVIRONMENT WITH PER-COMMAND ENVIRONMENT MANAGEMENT

FIELD

The present invention is in the field of computer systems. More particularly, the invention relates to testing computer systems.

BACKGROUND

Many different types of computing systems have attained widespread use around the world. These computing systems include personal computers, servers, mainframes and a wide variety of stand-alone and embedded computing devices. Sprawling client-server systems exist, with applications and information spread across many PC networks, mainframes and minicomputers. In a distributed system connected by networks, a user may access many application programs, databases, network systems, operating systems and mainframe applications. Computers provide individuals and businesses with a host of software applications including word processing, spreadsheet, accounting, e-mail, voice over Internet protocol telecommunications, and facsimile.

Users of digital processors such as computers continue to demand greater and greater performance from such systems for handling increasingly complex and difficult tasks. In addition, processing speed has increased much more quickly than that of main memory accesses. As a result, cache memories, or caches, are often used in many such systems to increase performance in a relatively cost-effective manner. Many modem computers also support "multi-tasking" or "multi-threading" in which two or more programs, or threads of programs, are run in alternation in the execution pipeline of the digital processor. A common architecture for high performance, single-chip microprocessors is the reduced instruction set computer (RISC) architecture characterized by a small simplified set of frequently used instructions for rapid execution. Thus, in a RISC architecture, a complex instruction comprises a small set of simple instructions that are executed in steps very rapidly. These steps are performed in execution units adapted to execute specific simple instructions. In a superscalar architecture, these execution units typically comprise load/store units, integer Arithmetic/Logic Units, floating point Arithmetic/Logic Units, and Graphical Logic Units that operate in parallel. In a processor architecture, an operating system controls operation of the processor and components peripheral to the processor. Executable application programs are stored in a computer's hard drive. The computer's processor causes application programs to run in response to user inputs.

Thus, a manufacturer will typically manufacture a variety of different computing systems that include tower models, notebook models and workstations. When a computer is manufactured it should be thoroughly tested before shipping to a customer. For example, a test of a computer may be conducted by causing the operating system to perform various routine functions and monitoring the performance. These routine functions may comprise copying files, changing computing environments and executing operating system subroutines. Thus, desirably, a multitude of tests are performed on the computing system before final packing and shipping. These tests must be performed for many, many computing systems.

Typically, the software for testing a computer resides on the computer itself. More specifically, the computer will contain a list of commands that cause the processor of the computer to execute one or more test programs. Various functional attributes of the computer are tested. Each command contained in the list of commands for testing the computer may require an associated environment within which to execute the command. The environment that a command needs includes two aspects. The first aspect is the current working directory. The second aspect is a list of memory based keyword/value pairs commonly referred to as environment variables. For example, an environment variable with a keyword of PATH may specify a value indicating a path of directories to search to find programs. To execute a command that requires a specific environment, there must be prior command(s) that specifically set the environment required for the command. Note that after setting an environment variable it remains in effect until it is removed or changed with another command. Thus, commands are executed in a specified environment.

Testing can be very time consuming, since the test software on each computer must be actuated and monitored individually. Thus, there is a need for a faster, automated testing method.

SUMMARY

The problems identified above are in large part addressed by systems, methods and media for testing a plurality of digital systems. An embodiment of one method comprises forming a connection between a serving device and a plurality of digital systems under test. The serving device serves to the plurality of digital systems, command messages, each command message specifying for a digital system under test one environment and at least one command. The method further comprises implementing by a digital system under test the setting of the specified environment and executing by the digital system under test the specified command within the implemented environment.

Another embodiment for testing a plurality of computer systems comprises a sequencer within a serving device to originate command messages. Each command message specifies an environment and at least one command intended for a computing system under test. A listener within a computer system under test receives a command message, and in response to the command message, sets the specified environment and executes the command intended for the computing system under test.

Another embodiment comprises a machine-accessible medium containing instructions for simultaneously testing a plurality of digital systems, which, when executed by one or more machines, causes said machines to perform operations, comprising transmitting command messages to one or more digital systems under test, each command message specifying an environment and a command to be executed by a digital system under test. The operations further comprise implementing by a digital system under test the specified environment and executing by the digital system under test the command within the implemented environment.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Systems, methods and media for providing a distributed execution environment with per-command environment management are disclosed. In one embodiment, a plurality of digital systems are connected to a serving device. The serving device comprises one or more sequencers to originate environment attributes and commands to be executed by one or more listeners. A sequencer is used to control a sequence of commands required by each digital system under test. These commands may need to be executed on either the digital system under test or by servers on behalf of the digital system under test. Each digital system under test uses a listener with an associated server directory to receive commands and their associated environment. A digital system under test sets the environment attributes and executes the received commands within the specified environment.

Figure 1:
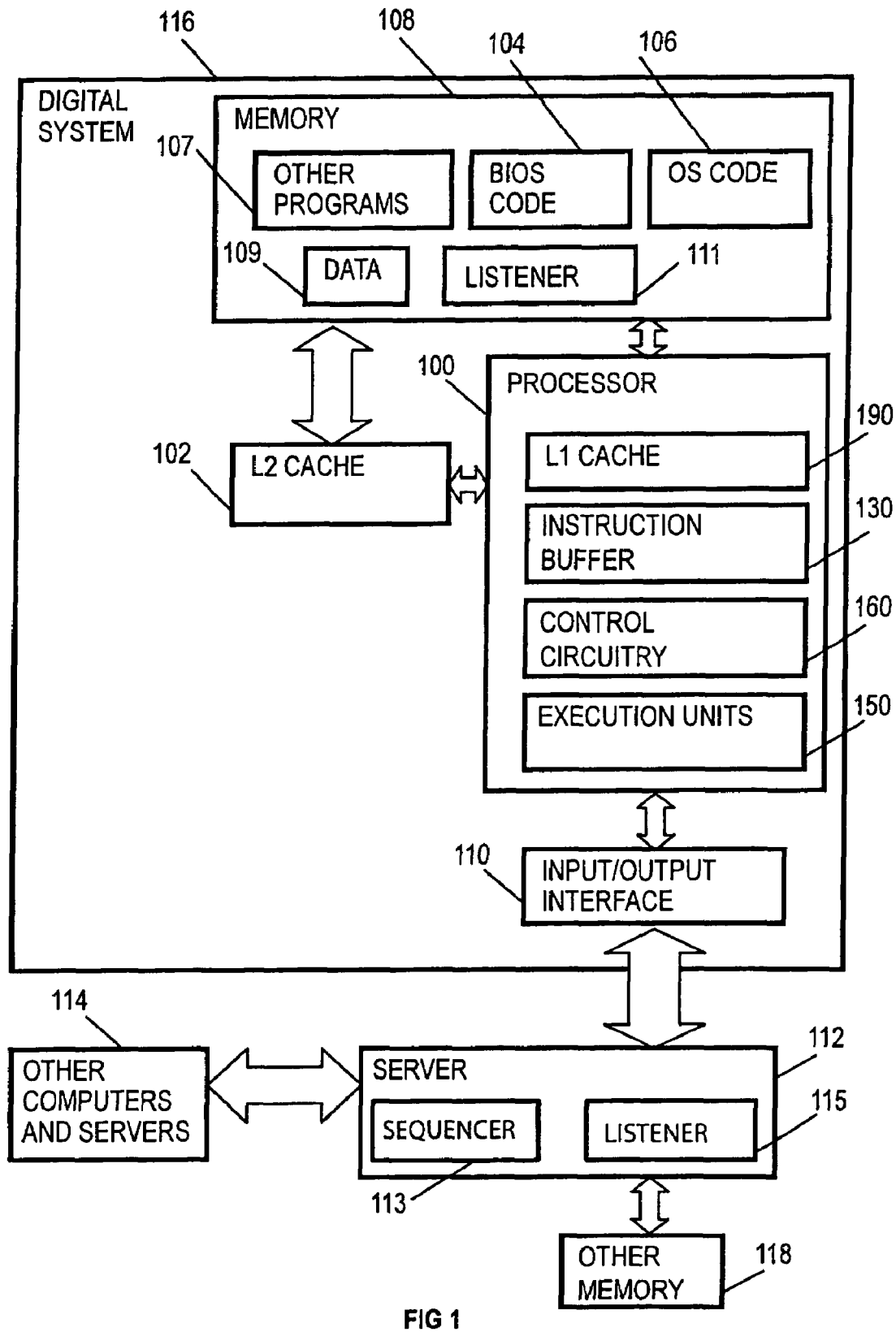
FIG. 1 depicts an embodiment of a digital system within a network; within the digital system is a processor.

FIG. 1 shows a digital system 116 such as a computer or server implemented in a network according to one embodiment of the present invention. Digital system 116 comprises a processor 100 that can operate according to basic input-output system (BIOS) Code 104 and Operating System (OS) Code 106. The BIOS and OS code are stored in memory 108. The BIOS code is typically stored on Read-Only Memory (ROM) and the OS code is typically stored on the hard drive of computer system 116. Memory 108 also stores other programs for execution by processor 100 and stores data 109. Digital system 116 comprises a level 2 (L2) cache 102 located physically close to processor 100.

Processor 100 comprises an on-chip level one (L1) cache 190, an instruction buffer 130, control circuitry 160, and execution units 150. Level 1 cache 190 receives and stores instructions that are near to time of execution. Instruction buffer 130 forms an instruction queue and enables control over the order of instructions issued to the execution units. Execution units 150 perform the operations called for by the instructions. Execution units 150 may comprise load/store units, integer Arithmetic/Logic Units, floating point Arithmetic/Logic Units, and Graphical Logic Units. Each execution unit comprises stages to perform steps in the execution of the instructions received from instruction buffer 130. Control circuitry 160 controls instruction buffer 130 and execution units 150. Control circuitry 160 also receives information relevant to control decisions from execution units 150. For example, control circuitry 160 is notified in the event of a data cache miss in the execution pipeline.

Digital system 116 also typically includes other components and subsystems not shown, such as: a Trusted Platform Module, memory controllers, random access memory (RAM), peripheral drivers, a system monitor, a keyboard, a color video monitor, one or more flexible diskette drives, one or more removable non-volatile media drives such as a fixed disk hard drive, CD and DVD drives, a pointing device such as a mouse, and a network interface adapter, etc. Digital systems 116 may include personal computers, workstations, servers, mainframe computers, notebook or laptop computers, desktop computers, or the like. Processor 100 also communicates with a server 112 by way of Input/Output Device 110. For example, I/O device 110 may comprise a network adapter. Server 112 may connect system 116 with other computers and servers 114. Thus, digital system 116 may be in a network of computers such as the Internet and/or a local intranet. Further, server 112 may control access to another memory 118 comprising tape drive storage, hard disk arrays, RAM, ROM, etc.

In one mode of operation of digital system 116, the L2 cache receives from memory 108 data and instructions expected to be processed in a pipeline of processor 100. L2 cache 102 is fast memory located physically close to processor 100 to achieve greater speed. The L2 cache receives from memory 108 the instructions for a plurality of instruction threads. Such instructions may include branch instructions. The L1 cache 190 is located in the processor and contains data and instructions preferably received from L2 cache 102. Ideally, as the time approaches for a program instruction to be executed, the instruction is passed with its data, if any, first to the L2 cache, and then as execution time is near imminent, to the L1 cache.

Execution units 150 execute the instructions received from the L1 cache 190. Execution units 150 may comprise load/store units, integer Arithmetic/Logic Units, floating point Arithmetic/Logic Units, and Graphical Logic Units. Each of the units may be adapted to execute a specific set of instructions. Instructions can be submitted to different execution units for execution in parallel. In one embodiment, two execution units are employed simultaneously to execute certain instructions. Data processed by execution units 150 are storable in and accessible from integer register files and floating point register files (not shown.) Data stored in these register files can also come from or be transferred to on-board L1 cache 190 or an external cache or memory. The processor can load data from memory, such as L1 cache, to a register of the processor by executing a load instruction. The processor can store data into memory from a register by executing a store instruction.

Thus, the system of FIG. 1 may include a plurality of computers with processors and memory as just described, connected in a network served by a server. The server facilitates and coordinates communications between the computers in the network. Each computer has its own memory for storing its operating system, BIOS, and code for executing application programs, as well as files and data. The memory of a computer comprises Read-Only-Memory (ROM), cache memory implemented in DRAM and SRAM, a hard disk drive, CD drives and DVD drives. The server also has its own memory and may control access to other memory such as tape drives and hard disk arrays.

In an embodiment of the invention, a server 112 is in electrical communication with a plurality of computers to be tested. The server comprises a sequencer 113 that sends command messages to each computer under test to cause execution of certain steps and programs by a computer to verify correct operation. The sequencer 113 is implemented as a program in a directory that is executed by a processor of the server. Each command message from sequencer 113 specifies at least one environment and at least one command. Server 112 further comprises a listener 115. The system under test, for example, digital system 116, comprises a listener 111 that implements the environment specified in a received command message and executes a received command within the environment. A listener 111 is implemented as a program in a directory that is executed by processor 100.

Figure 2:
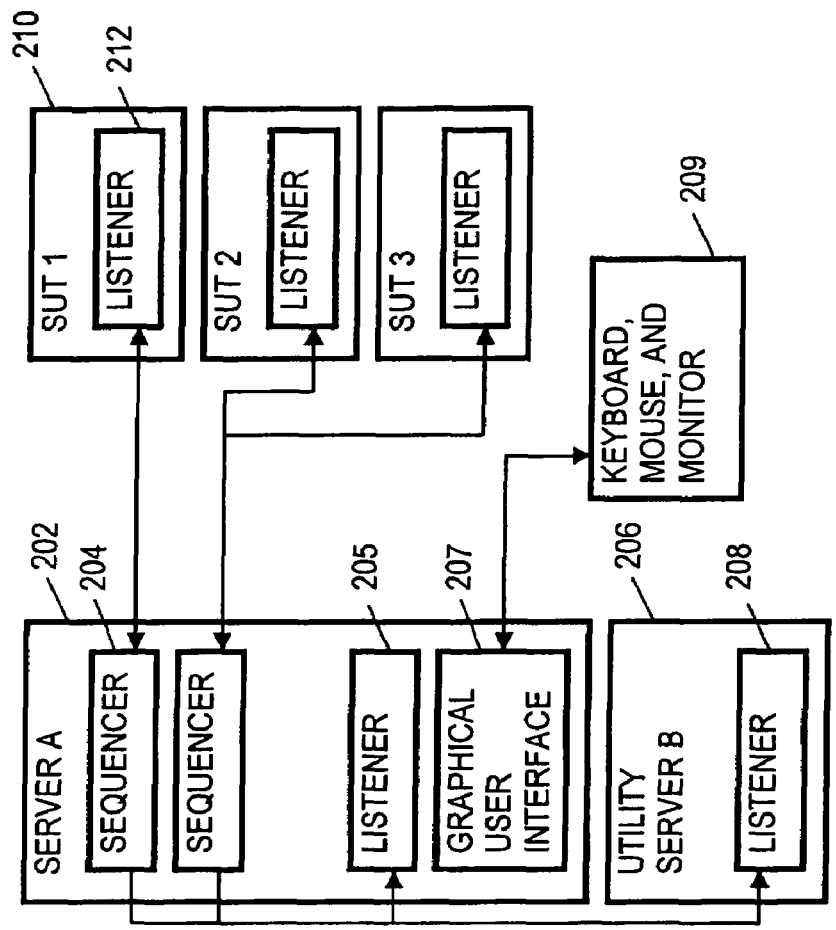
FIG. 2 depicts an embodiment of a system for passing commands and environment attributes to systems under test.

FIG. 2 shows an embodiment for testing a plurality of Systems Under Test (SUT). A controlling server A, 202, comprises one or more sequencers 204. Each sequencer is a master command scheduling program. A sequencer 204 originates command messages that are transmitted to the SUTs 210. A sequencer 204 of server 202 may also originate command messages that are transmitted to a listener of the server itself or to another server such as utility server B 206. Each server and each SUT may be a digital system such as digital system 116. Each server and each SUT include a listener 205, 208, 212. Each listener comprises a command queue (such as a message file directory or communication socket) for receiving commands from a sequencer.

In FIG. 2, the listener 205 of server 202 and the listener 208 of server 206 receive commands from both sequencers 204 of server 202. In an alternative embodiment, a single sequencer may originate command messages to a plurality of different listeners. Each SUT has a listener that receives commands from one or more sequencers 204. In an alternative embodiment, a single listener in an SUT 210 may receive commands from a plurality of sequencers from a plurality of servers. Thus, in one embodiment each of a plurality of servers has one or more sequencers and a listener. A listener of a first server can receive command messages from a sequencer of a second server and vice versa. Thus, embodiments can provide one-to-many and many-to-many correspondence between sequencers and listeners.

One example of an implementation of the embodiment of FIG. 2 is in a computer manufacturing and test environment. In this example, each system under test (SUT) 210 is a computer such as digital system 116 in a manufacturing line to be tested before final packing and shipping. Applying the methods herein described, each of a plurality of computers is connected to a server. Dozens or even hundreds of computers may be connected and tested at one time. The connection may, for example, be by Ethernet cable through network adapter installed on each computer under test. Alternatively, the server may be connected wirelessly to each computer using means known in the art. In a wireless environment, both the server and the computers under test are equipped with transmitter and receiver circuitry to both transmit and receive command messages and result messages.

Thus, a server 202 with one or more sequencers supplies command messages to the individual ones of the plurality of computers 210. For example, a command may instruct a first SUT to execute a first program residing in the first SUT's memory, and may instruct a second SUT to execute a second program residing in the second SUT's memory. Thus, one computer may be running a first test program while another computer is running a second test program. Each respective test program is run in response to a command of a command message intended for the computer. In this way, multiple computers may be tested simultaneously and more rapidly under unified control by a single sequencer.

Also, as noted above, a sequencer of a server may send command messages to a listener of the server itself. Thus, for example, a sequencer may originate command messages to control a graphical user interface 207 of the server to enable user interaction with the processes of the sequencers. For example, a keyboard, mouse, and color video monitor, 209 may enable a user to ineract with processes which are being run on each of the plurality of computers under test. The video monitor produces a display with options selectable by mouse or keyboard. Further, the server that sends command messages to the computers under test may also send command messages to utility server B 206. For example, server A may command utility server B to copy a file from the storage of server B to server A. Thus, server B 206 comprises a listener 208 to receive and execute commands from a sequencer 204 of server A 202.

The commands from the sequencers may be implemented in XML message protocol. An example command message may be outlined as follows:

| 1 | Message Tag - Start | <X3MSG> |
| 2 | One environment setting | <SETENV NAME = "PATH" VALUE=...> |
| 3 | Another environment setting | <SETENV NAME="LIBPATH" VALUE=...> |
| 4 | Command Tag - Start | <SEND_CMD ... Q="SUT1"...UID=1S2 ...> |
| 5 | Command to Execute | <[CDATA[test.exe -p1-p2]]> |
| 6 | Command Tag - End | </SEND_CMD> |
| 7 | Message Tag - End | </X3MSG> |

On line 1, the term in the right-hand column communicates that a new message is beginning. The term in line 2 uses the SETENV (set environment) element to specify one environment variable to set before executing the command. The SETENV element specifies a variable called PATH and further specifies a VALUE for the variable name. Similarly, the SETENV element in line 3 specifies another environment variable, called LIBPATH which is also required for the command. Line 4 contains a start command tag. The command identifies a Q for the device to which the command is sent, in this case, SUT 1. Line 4 also contains a UID which specifies a home directory from which to execute the command. Line 5 contains an example command using the CDATA element to communicate the command. In this example, the command causes the target device to execute a program called test.exe using two parameters, p1 and p2. Line 6 ends the command and line 7 ends the message. Note that the environment settings are in effect only for the duration of executing the command.

The command messages received by a listener from one or more sequencers may be started as received on a first-in-first-out basis. Note that the listener does not need to wait for completion of the command before starting other commands. When a command message is received and its command executed, the listener will send or cause to be sent a result message. An example result message may be outlined as follows:

| | | |
|---|---|---|
| 1 | Result Tag - Start | <SEND_RESULT . . . UID=1S1234> |
| 2 | Result RC | <RC>2</RC> |
| 3 | Result Mfg. Error | <MERR> . . . </MERR> |
| 4 | Result Tag - End | <SEND_RESULT> |

The first line signifies the start of a result message. The second line returns a program return code to the sequencer. The third line defines a manufacturing error code returned by the program. The fourth line ends the result message.

Figure 3:
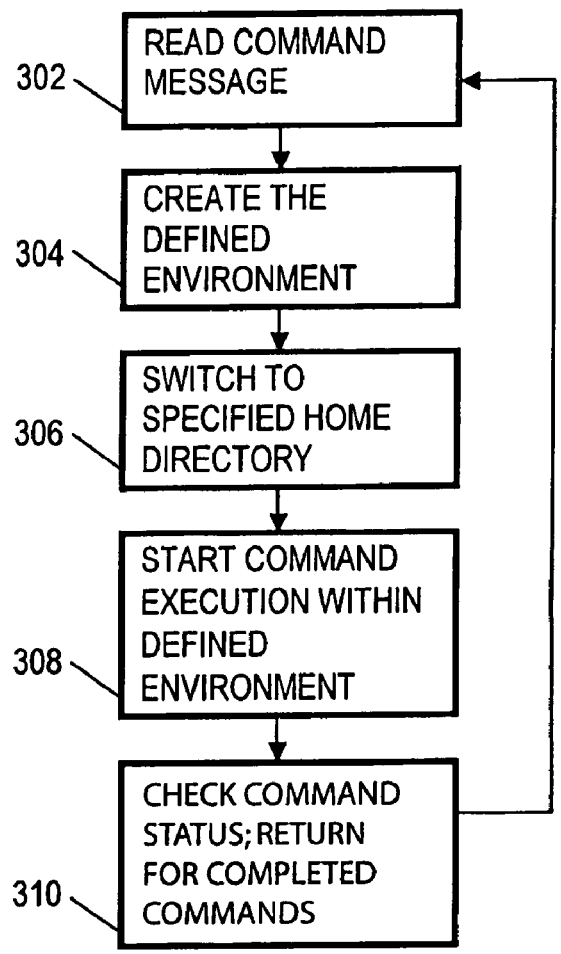
FIG. 3 depicts a flow chart of an embodiment of functions of a listener for receiving environment attributes and executing commands.

In operation, the listener of a system under test receives command messages, implements the environment contained in the command message, and executes the commands intended for the listener. FIG. 3 shows a flowchart 300 which depicts an operation of a listener for implementing environments and executing commands within an implemented environment. The listener has a queue that stores command messages received from a sequencer. The queue supplies to the listener command messages on a first-in-first-out basis. The listener reads a command message from the listener queue (element 302). The command message defines one or more environment variables. The listener reads the environment variables and sets up the environment defined by the environment variables (element 304). The command message also specifies a home directory from which to run a command. The listener switches the system under test to the specified home directory (element 306). The listener then causes the operating system of the computer under test to perform the command within the specified environment (element 308).

Asynchronously with reading and processing new command messages, the listener monitors command execution (element 310). The listener produces a result message (310) for each command that is completed. The result message is returned to the server from which the command message was received. Because the listener can operate asynchronously, a new command in a new environment may be capable of being performed by the computer under test while the process defined by a previous command is being executed by the same or another computer.

Thus, a listener receives from a sequencer the environment within which to execute a command and implements the specified environment. However, the process developer need not specify the environment for each command to be sent to a listener. Rather, the tree structure of the XML process control file is exploited by the sequencer to implement a scheme of inheritance. The inheritance scheme allows the process developer to specify the environment attributes at an arbitrary block level. The sequencer then inherits the environment from a backwards search of the command's ancestor tree, and packages the environment variables and working directory into the message being sent.

To see this, consider the following sample portion of a process control file, such as an X3 state file:

```
1  <BLOCK BNAME="SOLUTION" X3_XML_VERSION ="0.21">
2   <SETENV NAME="PATH" VALUE=... UID_DIR =...>
3   <BLOCK BNAME="TEST_SEQUENCE">
4    <BLOCK BNAME="DIAGNOSTICS">
5     <SETENV NAME="DIAG_DIR" VALUE=...>
6     <SEND_CMD Q="SERVER_B"...> ...</SEND_CMD>
7     <SEND_CMD Q="SUT3"...> ...</SEND_CMD>
8    </BLOCK>
9    <BLOCK BNAME="SEND_TEST_RESULTS">
```

-continued

```
10    <SETENV NAME="SAP_SERVER" VALUE=...>
11    <SEND_CMD Q="SUT1"...> ... </SEND_CMD>
12    <SEND_CMD Q="SUT2"...> ... </SEND_CMD>
13    <SEND_CMD Q="SERVER_A"...> ... </SEND_CMD>
14   </BLOCK>
15  </BLOCK>
16 </BLOCK>
```

In this example, the path is updated in line 2 to include a product specific directory unique to this state file, identified by UD_DIR. This directory is the working directory for executing commands. The SETENV attribute named PATH (line 2) applies the specified environment for all commands within the top level block named SOLUTION (line 1). The DIAG_DIR environment (line 5) applies to all commands within the block named DIAGNOSTICS (line 4). Similarly, the SAP_SERVER environment (line 10) applies to all commands within the block named SEND_TEST_RESULTS (line 9). Thus, the commands sent on lines 6 and 7 inherit the environments named PATH and DIAG_DIR, whereas the commands sent on lines 11 through 13 inherit the environments named PATH and SAP_SERVER.

The inheritance features just described enable a process developer to easily control the scope of environments as applied to commands to be executed by a listener. Thus, a block command delimits the scope of an environment so that all commands within the block inherit the environment or environments associated with the block. Commands that are not within the block do not inherit the environments associated with the block.

Note that each send command, SEND_CMD, (lines 6, 7 and lines 11-13), names a queue to which a command message is submitted. For example, line 6 names a queue for the server itself, whereas line 7 names a queue for SUT number 3. Each different queue corresponds to a different listener. So, when a command message is placed in a queue, it is read by the corresponding listener. The command message is then processed in its turn. Therefore, a single sequencer program can originate command messages for a plurality of different target devices. Also, different sequencer programs can also run asynchronously on the server. Thus, the system enables a single server to simultaneously control and test operation of a plurality of systems under test.

Thus, an embodiment comprises a server connected to a plurality of digital systems under test. The server comprises one or more sequencers to originate command messages comprising environment attributes and commands. Each command is executed by a receiving system under test within the one or more environments specified for the command. Each command has an associated queue which designates which system under test is to receive and execute the command. Using the command message structure defined herein, environments may be nested. For example, consider the command message structure outlined below.

```
BLOCK
  SETENV (1)
  CMD (1)
  BLOCK
    SETENV (2)
    CMD (2)
  /BLOCK
/BLOCK
```

In this example, a first environment (1) applies to a first command and a second command, and a second environment (2) applies to the second command but not the first command. This ability to nest commands offers great flexibility to the process developer. Moreover, by specifying a queue for each command, the environments specified for a group of commands are inherited by the different systems under test or servers receiving the commands Some embodiments of the invention are implemented as a program product for use with a computer system such as, for example, the system 116 shown in FIG. 1. The program product could be used on other computer systems or processors. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive or write-able CD disk); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-accessible format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Thus, another embodiment of the invention provides a machine-accessible medium containing instructions effective, when executing in a data processing system, to cause the system to perform a series of operations for testing a plurality of digital systems. The operations comprise transmitting command messages to one or more digital systems under test, each command message specifying an environment and a command to be executed by a digital system under test. The operations further comprise implementing by a digital system under test the specified environment and executing by the digital system under test the command within the implemented environment. The operations may further comprise specifying a home directory from which a command is to be executed by a digital system under test. In one embodiment, commands of command messages sent to different digital systems under test are executed by the different systems under test simultaneously. The operations may still further comprise sending a result message from a digital system under test concerning execution of a command by the digital system under test.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for testing a plurality of digital systems, comprising;

forming a connection between a serving device and a plurality of digital systems under test;

serving from a sequencer running on the serving device to the digital systems, command messages, each command message specifying for a listener within a digital system under test a plurality of nested directories and at least one command;

placing command messages in a queue of a listener to enable execution of one command before execution of another command is completed; and implementing by the system under test the specified directories for the duration of at least one command within a command message and executing by the system under test the command within the implemented directories.

2. The method of claim 1, wherein a listener transmits to the sequencer a result message comprising information concerning execution of a command by the system under test while at least one other command is being executed by the system under test.

3. The method of claim 1, wherein commands of command messages sent by one or more sequencers to different listeners are executed by the devices under test simultaneously using the directories contained within each individual command message.

4. The method of claim 1, wherein commands of command messages sent from different sequencers to a single listener are executed by that device under test corresponding to the listener within the directories specified within each individual command message.

5. The method of claim 1, wherein a listener comprises a first-in-first-out directory to receive command messages.

6. The method of claim 1, wherein a command of a command message specifies a listener queue to transmit a command.

* * * * *